United States Patent Office 3,190,895
Patented June 22, 1965

3,190,895
SUBSTITUTED ANDROSTAN-16α-YLACETIC ACIDS
Paul Kurath, Waukegan, Ill., assignor to Abbott Laboratories, North Chicago, Ill., a corporation of Illinois
No Drawing. Filed Jan. 31, 1963, Ser. No. 255,206
5 Claims. (Cl. 260—397.1)

The present application is concerned with a class of new steroids and a process of their preparation. More particularly, the application is concerned with compounds of the formula

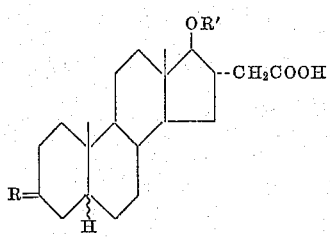

wherein R is oxygen or

and wherein R' is hydrogen or acetyl.

The new compounds, namely the 16α-substituted androstanes of the above formula, are useful hormonally-active substances. They have anabolic properties such as the stimulation of muscle growth and the retention of nitrogen but, unlike other anabolic agents, have no or only negligible androgenic side-effects.

The present invention is also concerned with 3β,17β-diacetoxy-5α-androstan-16α-ylacetic acid which is an important new intermediate necessary in the preparation of the above-described new steroids.

Some of the new compounds of the above class of steroids are made by completely reducing 3β,17β-diacetoxy-5-androsten-16-ylidenacetic acid in the presence of a hydrogenation catalyst. The main product obtained in such a reduction is the 3β,17β-diacetoxy-5α-androstan-16β-ylacetic acid which has been described previously in U.S. 3,045,012. However, the above-described hydrogenation also produces as side products some other materials which, upon alkaline hydrolysis and subsequent acidification, result in a mixture of 3β,17β-dihydroxy-5α-androstan-16α-ylacetic acid, 3β,17β-dihydroxy-5β-androstan-16β-ylacetic acid lactone, 3β,17β-dihydroxy-5α-androstan-16β-ylacetic acid lactone, and 3β,17β-dihydroxy-5β-androstan-16α-ylacetic acid. Accepted laboratory procedures can be employed to separate this mixture into its components.

To illustrate the preparation of the new compounds in more detail, reference is made to the appended examples which are by no means the only methods to obtain the described new compounds. In these examples, all melting points given are uncorrected and were determined on a Fisher-Johns melting-point apparatus. All optical rotations were measured in a 1-dm. tube and the values have a limit of error of ±2°. All reference to petroleum ether in these examples is to be understood to denote the fraction boiling in the range of 90–100° C. In these examples, wherever reference is made to a mixture of solvents and no ratio of such solvents is given, it is to be understood that the first solvent is used to dissolve the material to make a concentrated solution and the second solvent is then added to introduce or to complete crystallization

EXAMPLE 1

*3β,17β-dihydroxy-5α-androstan-16α-ylacetic acid*

A solution of 40 grams of 3β,17β-diacetoxy-5-androsten-16-ylidenacetic acid dissolved in 1500 ml. of glacial acetic acid is hydrogenated in the presence of 4 grams of platinum oxide until the uptake of hydrogen ceases. The solution is filtered and evaporated to dryness in vacuum. The crystalline residue is recrystallized twice from methanol/water to yield 22.38 grams of 3β,17β-diacetoxy-5α-androstan-16β-ylacetic acid. Evaporation of the mother liquors produces a residue of 17.5 grams of material which is dissolved in acetic acid and shaken in an atmosphere of hydrogen in the presence of a platinum catalyst to insure complete reduction. The catalyst is recovered by filtration and the resulting solution is evaporated to dryness under reduced pressure to leave a residue of 17.6 grams which is dissolved in 750 ml. of methanol and 75 ml. of water. This solution is refluxed with 20.5 grams of potassium hydroxide for 2 hours, after which time the reaction mixture is diluted with 2400 ml. of water. The solution is then concentrated to a volume of about 2000 ml. and the resulting slurry is acidified with 500 ml. of 10% hydrochloric acid. After warming the mixture on the steam bath for 20 minutes, with subsequent cooling, the aqueous suspension is extracted with two 3000-ml. and three 1500-ml. portions of ethyl acetate. The organic solution is washed until neutral, dried over anhydrous magnesium sulfate, and concentrated to about 500 ml. After cooling, the crystals are collected on a filter and dried to give 5.089 grams of 3β,17β-dihydroxy-5α-androstan-16α-ylacetic acid melting at 270–1° C.

An analytically pure sample, recrystallized from methanol, has a melting point of 275–6° C., an $[\alpha]_D^{26}$ of $-25°$ (at a concentration of 0.616 in dioxane), and shows analytical values of 72.18% C and 10.12% H, which is in close agreement with the calculated values of the compound of empirical formula $C_{21}H_{34}O_4$.

EXAMPLE 2

*3β,17β-dihydroxy-5β-androstan-16α-ylacetic acid*

The ethyl acetate mother liquor obtained in Example 1 is evaporated to dryness leaving 8.405 grams which is placed on a 600-gram column of silica gel as benzene solution. The chromatographic column is extracted with ether/acetone (95:5). From the early eluates, 3β,17β-dihydroxy-5β-androstan-16β-ylacetic acid lactone, and from the late fractions 3β,17β-dihydroxy-5α-androstan-16β-ylacetic acid lactone can be isolated. Further elution of the silica gel column with acetone and acetone/methanol (90:10 and 80:20) yields 0.901 gram of 3β,17β-dihydroxy-5β-androstan-16α-ylacetic acid.

Several recrystallizations from acetone yield 0.166 gram of the pure compound melting at 259–60° C. Concentration of the mother liquors affords an additional 0.212 gram of this material. The pure sample has an $[\alpha]_D^{21}$ of $-25°$ (at a concentration of 0.562 in dioxane). The mixed melting point of this compound and 3β,17β-dihydroxy-5α-androstan-16α-ylacetic acid and the infrared spectra of these two compounds prove that these compounds are not the same. The analytical values are 71.80% C and 9.90% H, which are in close agreement with the calculated values for the compound of empirical formula $C_{21}H_{34}O_4$.

EXAMPLE 3

*3β,17β-diacetoxy-5α-androstan-16α-ylacetic acid*

A solution of 4.784 grams of 3β,17β-dihydroxy-5α-androstan-16α-ylacetic acid (from Example 1) in 56 ml. of pyridine and 28 ml. of acetic anhydride is allowed to stand overnight at room temperature. After adding 26 ml. of water to the reaction mixture, the mixture is warmed on a steam bath for 2 hours. The subsequently cooled solution is poured into 560 ml. of ice water. The resulting precipitate is collected on a filter and washed with several small amounts of water. The residue is dried and recrystallized twice from acetone/petroleum ether to give 4.180 grams of 3β,17β-diacetoxy-5α-androstan-16α-ylacetic acid which amounts to a yield of 70% of theory. The first crop material has a melting point of 203–5° C., while a second crop, obtained by concentrating the mother liquor, of 1.713 grams of crystalline material melts at 183–90° C.

An analytical sample has a melting point of 208–9° C., an $[\alpha]_D^{25}$ of —55° (at a concentration of 1.115 in chloroform) and an $[\alpha]_D^{22}$ of —50° (at a concentration of 1.152 in dioxane). The analytical values of 69.03% C and 8.67% H are in excellent agreement with the calculated values for the compound of empirical formula $C_{25}H_{38}O_6$.

EXAMPLE 4

*17β-acetoxy-3β-hydroxy-5α-androstan-16α-ylacetic acid*

A mixture of 4.180 grams of the diacetoxy compound of Example 3, 2.59 grams of potassium carbonate, 26 ml. of water, and 212 ml. of methyl alcohol is allowed to stand for 4 days at room temperature. To this mixture is then added 240 ml. of water followed by evaporation of most of the methanol at about 40° C. under reduced pressure. The reaction mixture is then acidified with 150 ml. of 2 N hydrochloric acid. The formed precipitate is collected on a filter, washed with several small amounts of water, and recrystallized from methanol/water to give 3.566 grams of 17β-acetoxy-3β-hydroxy-5α-androstan-16α-ylacetic acid, corresponding to 95% of the theoretical yield.

An analytical sample sinters at 238° C. and melts at 244–6° C.; it has an $[\alpha]_D^{27}$ of —45° (at a concentration of 0.968 in dioxane). The analytical values of 70.60% C, 9.47% H, and 20.55% O are in good agreement with the calculated values for the compound of the formula $C_{23}H_{36}O_5$.

When the above procedure is repeated, a polymorphic form of 17β-acetoxy-3β-hydroxy-5α-androstan-16α-ylacetic acid is sometimes obtained, having the same infrared pattern and analysis but showing a melting point of 263–4° C. and an $[\alpha]_D^{28}$ of —48° (at a concentration of 0.975 in dioxane).

EXAMPLE 5

*17β-acetoxy-3-oxo-5α-androstan-16α-ylacetic acid*

A solution of 2.267 grams of 17β-acetoxy-3β-hydroxy-5α-androstan-16α-ylacetic acid (from Example 4) in 290 ml. of acetone is cooled to 5° C. The solution is swirled while 2.9 ml. of chromium trioxide reagent [cf. Djerassi et al., J. Org. Chem., 21, 1547 (1956)] is added in a nitrogen atmosphere. After 10 minutes, the reaction mixture is diluted with 1200 ml. of water. The formed precipitate is collected on a filter, washed with several small amounts of water, and dried at 60° under reduced pressure. The product is further purified by chromatography on 200 grams of silica gel. From the benzene/ether (1:1) and ether eluates, a total of 1.555 grams of a solid residue is obtained. This material is recrystallized from acetone/petroleum ether to give 1.102 grams of 17β-acetoxy-3-oxo-5α-androstan-16α-ylacetic acid melting at 200–2° C. A second crop amounts to 0.199 gram with a melting point of 199–201° C., thus bringing the yield to 58% of theory.

Recrystallization for analysis produces a constant melting point of 201–2° C. and an $[\alpha]_D^{24}$ of —31° (at a concentration of 1.095 in chloroform) and an $[\alpha]_D^{22}$ of —28° (at a concentration of 0.934 in dioxane). The analytical values of 70.99% C and 8.96% H are in close agreement with the calculated values for the empirical formula $C_{23}H_{34}O_5$. The compound remains unchanged on sublimation at 200–20° C. under high vacuum.

EXAMPLE 6

*17β-hydroxy-3-oxo-5α-androstan-16-α-ylacetic acid*

A solution of 1.26 grams of 17β-acetoxy-3-oxo-5α-ylacetic acid (from Example 5) and 1.33 grams of potassium hydroxide pellets in 133 ml. of methanol and 13 ml. of water is refluxed for 90 minutes. The solution is then diluted with 165 ml. of water and most of the methanol is removed under reduced pressure. The mixture is then acidified with 50 ml. of 10% hydrochloric acid. The resulting slurry is warmed on a steam bath for 10 minutes and allowed to cool. The precipitate is collected on a filter, washed with several small portions of water, and dried under reduced pressure at 75° C. The product is recrystallized from acetone to give 1.012 grams (or 90% of theory) of 17β-hydroxy-3-oxo-5α-androstan-16α-ylacetic acid melting at 253–4° C. A second crop amounting to 0.046 gram is obtained, melting at 243–6° C.

An analytical sample shows a melting point of 254–5° C. and an $[\alpha]_D^{25}$ of —11° (at a concentration of 0.765 in dioxane). The analytical values of 72.55% C. and 9.25% H are in excellent agreement with the calculated values for the empirical formula $C_{21}H_{32}O_4$. The compound does not change on sublimation at 220–50° under high vacuum.

EXAMPLE 7

*3β,17β-diacetoxy-5β-androstan-16α-ylacetic acid*

By replacing 3β,17β-dihydroxy-5α-androstan-16α-ylacetic acid with the corresponding 5β-compound (from Example 2) but otherwise proceeding exactly as described in Example 3, 3β,17β-diacetoxy-5β-androstan-16α-ylacetic acid is obtained. An analytical sample melts at 109–11° C. and the analytical values are in close agreement with the calculated values for the compound of empirical formula $C_{25}H_{38}O_6$.

EXAMPLE 8

*17β-acetoxy-3β-hydroxy-5β-androstan-16α-ylacetic acid*

By partially hydrolyzing the diacetoxy compound of Example 7 in the manner described in Example 4, 17β-acetoxy-3β-hydroxy-5β-androstan-16α-ylacetic acid is obtained. Its analytical values are in close agreement with the calculated values for the compound of empirical formula $C_{23}H_{36}O_5$.

EXAMPLE 9

*17β-acetoxy-3-oxo-5β-androstan-16α-ylacetic acid*

Replacing the starting material used in Example 5 by the partially hydrolyzed material obtained in Example 8, and following the oxidation procedure of Example 5, 17β-acetoxy-3-oxo-5β-androstan-16α-ylacetic acid is obtained. The analytical values are in good agreement with the calculated values for the compound of empirical formula $C_{23}H_{34}O_5$.

EXAMPLE 10

*17β-hydroxy-3-oxo-5β-androstan-16α-ylacetic acid*

By repeating the procedure shown in Example 6 but using as the starting material the compound described in Example 9, 17β-hydroxy-3-oxo-5β-androstan-16α-ylacetic acid is obtained. Its analytical values are in close agreement with the calculated values for the compound of empirical formula $C_{21}H_{32}O_4$.

In all the above examples, the infrared spectra were recorded on a Perkin-Elmer infrared spectrophotometer, Model 21, and the patterns obtained were all found to be in agreement with the expected curves.

An important step in the preparation of the 3-oxo-compounds of the present invention is the partial hydrolysis of the corresponding 3,17-diacyloxy compounds. This hydrolysis is carried out in an aqueous alcohol solution and in the presence of an alkaline reagent which is preferably selected from alkali carbonates, bicarbonates or hydroxides. In spite of the presence of two hydrolyzable groups in the molecule, these alkaline reagents can be used for only a partial hydrolysis because the acyloxy group in the 3-position is much more reactive than that in the 17-position. Although the above examples show this hydrolysis to be carried out only with the 3,17-diacetoxy-androstan-16-ylacetic acid, it is to be understood that inert substituents may also be attached to the steroid system and that the 3- and 17-positions may carry the radicals of higher fatty acids. For instance, this partial hydrolysis can also be used for the preparation of a 3-hydroxy-17-propionoxyandrostan-16-ylbutyric acid from the corresponding 3,17-dipropionoxysteroid in the presence of alcohol, water and sodium hydroxide. The hydrolysis is ordinarily carried out at room temperature, but higher temperatures may be used where a more rapid reaction rate is desired. From the obtained 3-hydroxy-17-acyloxy-steroid obtained in this manner, oxidation will produce the corresponding 3-oxosteroid which can then be hydrolyzed in the 17-position to the corresponding 3-oxo-17-hydroxysteroid.

Others may practice the invention in any of the numerous ways which will be suggested to one skilled in the art by the present disclosure. All such practice of the invention is considered a part hereof provided it falls within the scope of the appended claims.

I claim:
1. A steroid of the formula

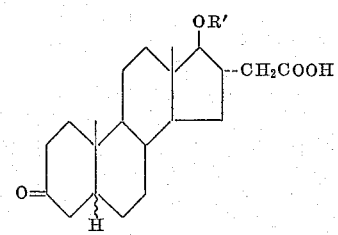

wherein R' is selected from the group consisting of hydrogen and acetyl.
2. 3-oxo-17β-hydroxy-5α-androstan-16α-ylacetic acid.
3. 3-oxo-17β-acetoxy-5α-androstan-16α-ylacetic acid.
4. 3-oxo-17β-hydroxy-5β-androstan-16α-ylacetic acid.
5. 3-oxo-17β-acetoxy-5β-androstan-16α-ylacetic acid.

References Cited by the Examiner
UNITED STATES PATENTS
3,045,012  7/62  Kurath et al. _____ 260—239.57

OTHER REFERENCES
Fajkos et al.: Chem. Abs. 49, col. 359(h), 1955.
Fajkos et al.: Chem. Abs. 50, col. 15571(d), 1956.
Fieser et al.: Steroids, pages 470, 527 and 528 and 694 (1959), Reinhold Pub. Co., New York, N.Y.
Julian et al.: J.A.C.S. 70, pages 3872–75 (1948).
Lowenthan: Tetrahedron, vol. 6, pages 269–303, June 1959.

LEWIS GOTTS, *Primary Examiner.*